United States Patent [19]
Whitted

[11] Patent Number: 5,682,872
[45] Date of Patent: Nov. 4, 1997

[54] CAMPING FURNACE

[76] Inventor: J. R. Whitted, P.O. Box 84, Grandview, Id. 83624

[21] Appl. No.: 587,402

[22] Filed: Jan. 17, 1996

[51] Int. Cl.$^6$ ............................................. F24B 3/00
[52] U.S. Cl. ................... 126/29; 126/25 B; 126/9 R; 110/241
[58] Field of Search ................... 126/29, 9 R, 9 B, 126/25 B, 30; 110/241

[56] References Cited

U.S. PATENT DOCUMENTS

| | | | |
|---|---|---|---|
| D. 333,941 | 3/1993 | Hait | D7/335 |
| 936,482 | 10/1909 | Seeley | |
| 1,345,775 | 7/1920 | Hoffman | |
| 2,356,788 | 8/1944 | Herron | 126/43 |
| 2,939,773 | 6/1960 | Rymer | 126/9 B |
| 3,330,232 | 7/1967 | Wagle | 110/241 |
| 3,384,066 | 5/1968 | Tufts | 126/9 R |
| 3,494,349 | 2/1970 | Allen | 126/25 B |
| 4,206,741 | 6/1980 | Prigge | 126/25 A |
| 4,331,125 | 5/1982 | Storandt | 126/29 |
| 4,351,314 | 9/1982 | Morton | 126/59 |
| 4,363,313 | 12/1982 | Smith | 126/30 |
| 4,788,906 | 12/1988 | Starks | 99/450 |
| 4,829,977 | 5/1989 | Valentine | 126/30 |
| 4,905,659 | 3/1990 | Armistead | 126/9 |
| 5,163,415 | 11/1992 | Moncrief et al. | 126/43 |
| 5,329,917 | 7/1994 | Young | 126/29 |
| 5,355,867 | 10/1994 | Hall et al. | 126/30 |
| 5,404,864 | 4/1995 | Kent, Jr. | 126/9 B |
| 5,495,845 | 3/1996 | Hait | 126/29 |

FOREIGN PATENT DOCUMENTS 2074309 10/1981 United Kingdom ............... 126/25 B

*Primary Examiner*—Carroll B. Dority
*Attorney, Agent, or Firm*—Ken J. Pedersen; Barbara S. Pedersen

[57] ABSTRACT

The apparatus described and illustrated is a camping furnace used for cooking or warming food outdoors. The apparatus surrounds the burning fuel and directs smoke upward. Fuel and heat are used efficiently and the danger of the spread of fire is minimized. When it is safe to do so, the apparatus may be easily moved, leaving ash and spent fuel behind. Preferably, the enclosure wall of the furnace is made of separable and/or hinged sections, for adapting the furnace to a flatter, more compact shape for storage and transport.

14 Claims, 5 Drawing Sheets

CAMPING FURNACE

BACKGROUND OF THE INVENTION

1. Field of the Invention

This invention relates to camping cooking stoves.

2. Related Art

U.S. Pat. No. 936,482, issued to Walter B. Seeley in 1909, discloses a portable stove of cylindrical shape having vents near both top and bottom. Accommodation for the inlet of air near the bottom of stoves also appear in patents issued to Hoffman (U.S. Pat. No. 1,345,775), Herron (U.S. Pat. No. 2,356,788), Morton (U.S. Pat. No. 4,351,314), Von Kohorn (U.S. Pat. No. 4,788,905), Armistead (U.S. Pat. No. 4,905,659), and Moncrief (U.S. Pat. No. 5,163,415). Portability and cylindrical shape are common to the stoves disclosed in these patents, except perhaps Von Kohorn.

Two portable outdoor grills as patented by Prigge (U.S. Pat. No. 4,206,741) and Hall (U.S. Pat. No. 5,355,867) include horizontal grills supported above the ground by a pole or tripod. These grills leave ash and spent fuel behind when lifted out of place, but, during use, do not contain the fuel, fire, or ashes and do not direct smoke upward.

SUMMARY OF THE INVENTION

The invention herewith disclosed comprises a camping furnace which can be used to contain a campfire for providing heat, light, and a cooking fire for any outdoor activity. The design of this furnace is such as to effectively direct smoke upward and contain burning fuel and ash within its own bottom circumference during the cooking process. This furnace contains even large fires, which are sometimes needed for heat and light in large campsites, but which would otherwise endanger surrounding vegetation and property. Containment of burning fuel should allow more complete combustion of the fuel and virtually eliminate the danger of the spread of fire. After use, the furnace may be lifted and moved to a new cooking location or campsite, leaving behind cooled or smothered ash and spent fuel.

Preferably, perforated and/or solid cooking/warming surfaces rest on or are fastened near the top of the furnace. Preferably, the furnace has an enclosure wall which is made of sections that are hinged and/or separable. These sections allow the furnace wall to be flattened or disassembled for compact storage.

BRIEF DESCRIPTION OF THE DRAWINGS

FIGS. 1A and 1B show the vents below the enclosure wall's midpoint.

DESCRIPTION OF THE PREFERRED EMBODIMENTS

Figure 1A:
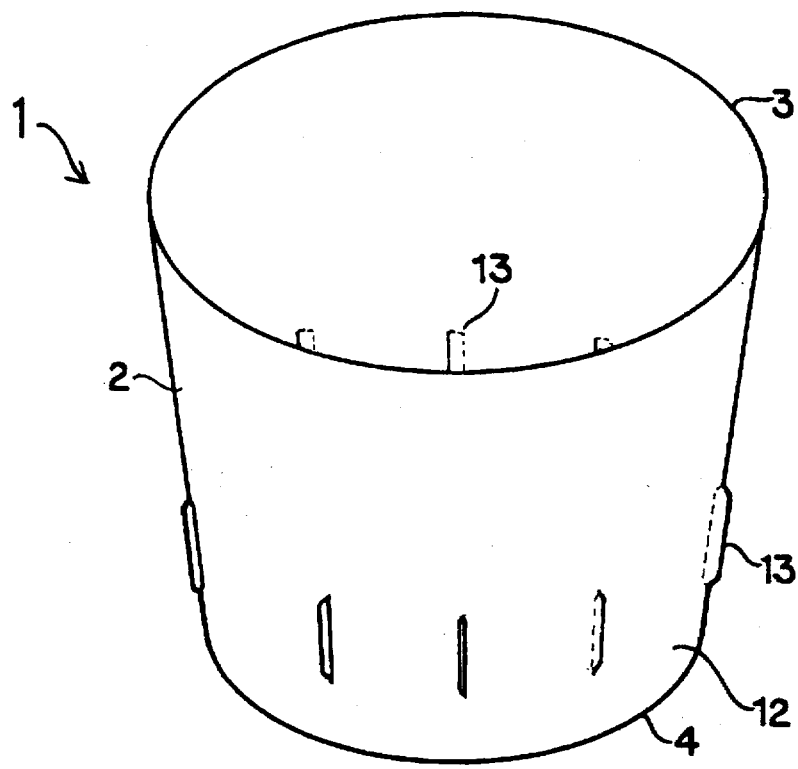
FIG. 1A shows one embodiment of the invented camping cooking furnace tilted to show the open top end of the enclosure wall.
Figure 1B:
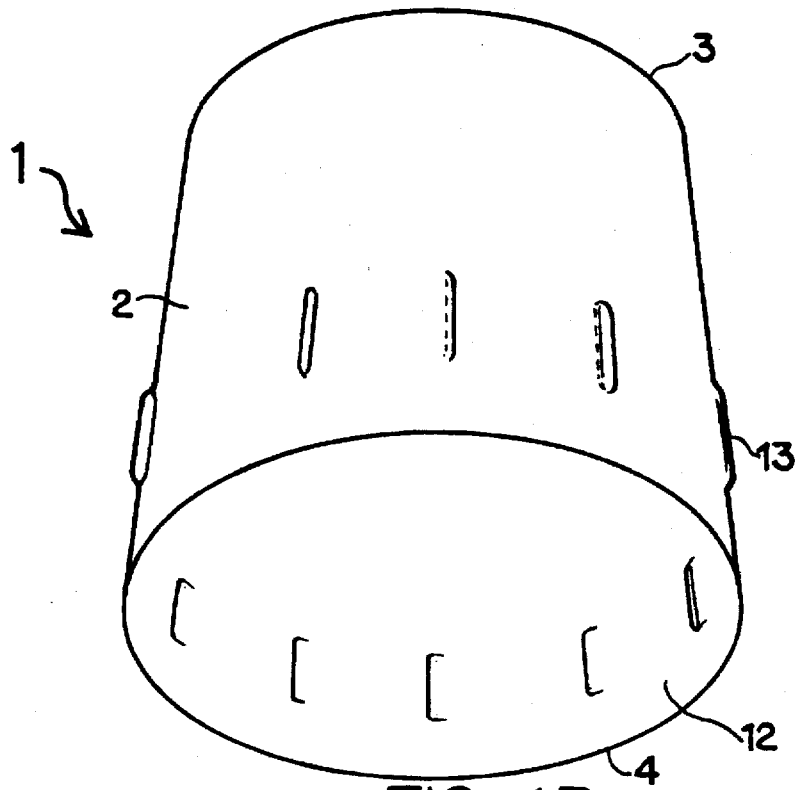
FIG. 1B shows the embodiment of FIG. 1A tilted to show the open bottom end. Both

Referring to the Figures, there are shown several, but not the only, embodiments of the invented camping cooking furnace. The camping cooking furnace (1) as shown in FIG. 1 has an enclosure wall (2) that is open ended, generally cylindrical, and made of heat resistant metal. "Generally cylindrical" in this description and in the claims includes the preferred conoid shape (illustrated in FIGS. 2 and 3) and other shapes that appear generally tubular, as well as true cylinders. Likewise, "generally semi-cylindrical" refers to axially-extending sections of a generally cylindrical surface (including a conoid surface). The measurement of the length of the enclosure wall (2) from top edge (3) to bottom edge (4) equals or exceeds the measurement of its diameter, the diameter preferably being approximately twenty-four inches. When in use, the furnace (1) stands on one open end, that is, the bottom end 12 with the is bottom edge (4) resting on or slightly imbedded in the ground (5); the vertical length of the enclosure wall (2) is thus the height of the cooking surface above ground (5) and as such will typically be approximately twenty-four to thirty inches. Top edge (3) preferably has a slightly larger diameter than the bottom edge (4). Bottom end (12) is characterized by the presence of vent or louver, openings (13) cut at regular intervals in the entire circumference of the enclosure wall (2) below the midway point but some distance away from the enclosure wall bottom edge (4).

Figure 2:
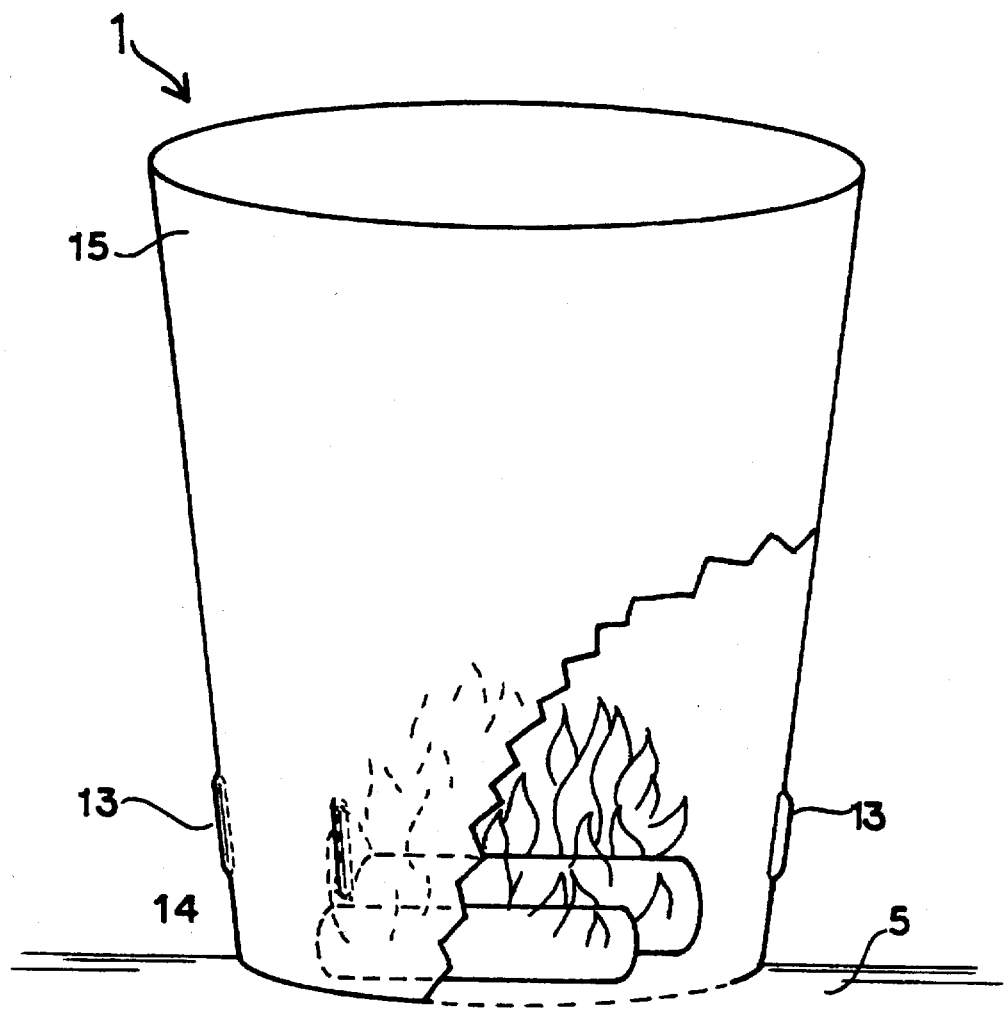
FIG. 2 shows a cutout, side perspective view of the embodiment of FIGS. 1A and 1B, with a fire burning inside the furnace.

As shown in FIG. 2, the enclosure wall (2), and particularly the wall bottom region (14) between the bottom edge (4) and the air vent or louver openings (13), confines and contains fuel and ash while the camping cooking furnace (1) is in use. The openings (13) are configured in such a way that air flow through them and upward through the inside of the enclosure wall has a "furnace" effect. This air flow pattern directs smoke upward and away from the furnace (1) in a way that makes standing near the furnace (1) safer and more pleasant than with conventional fires and cook stoves. Optionally, louvered; and openings (13) may be angled in such a way as to create a vortex air flow inside the enclosure wall (2).

Figure 3:
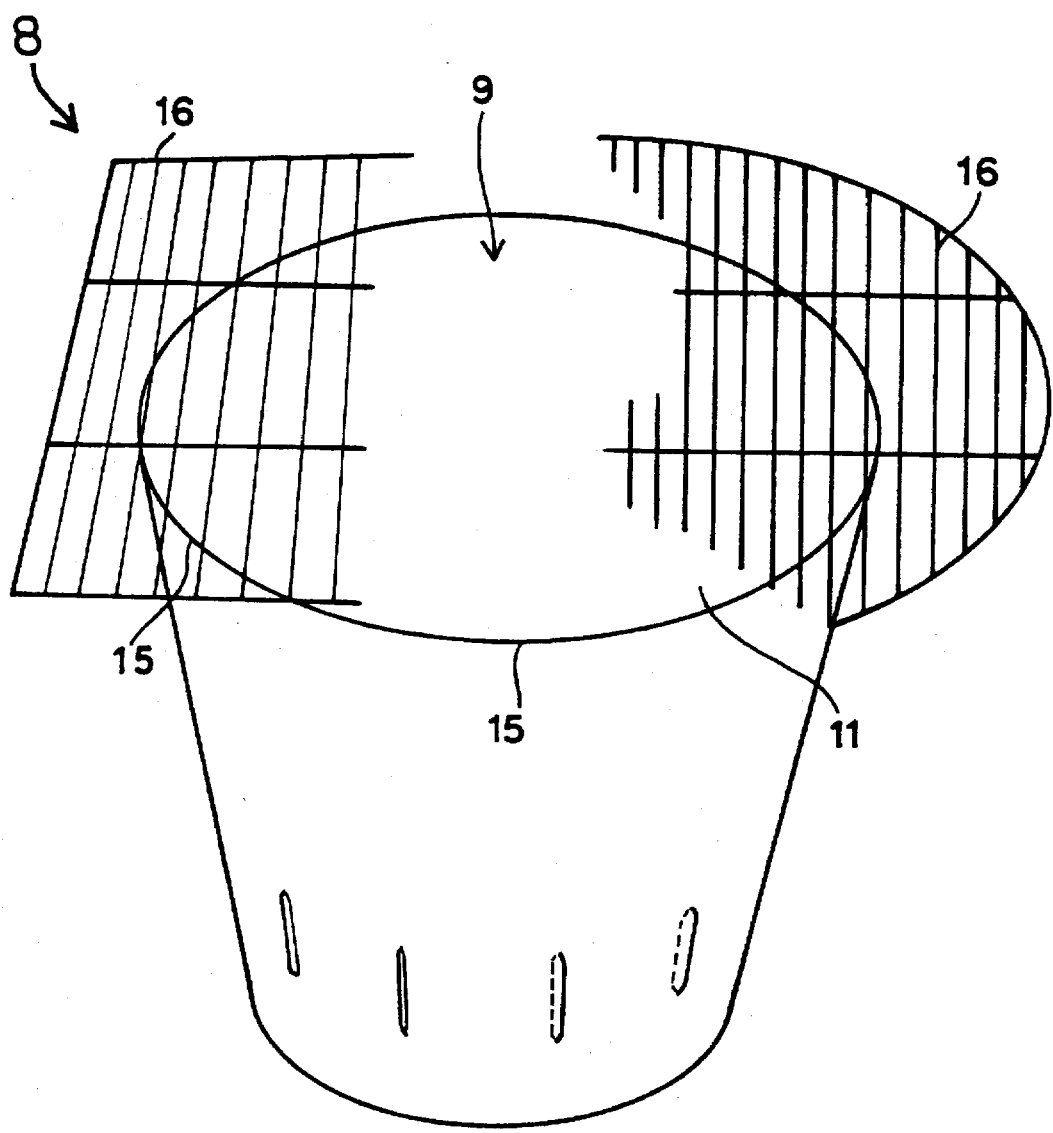
FIG. 3 shows a side, perspective view of another embodiment of the invention, with two embodiments of a grill resting on the top of the furnace.

The unvented end of the enclosure wall (2) is, when the furnace is in use, therefore the top end (15). As shown by the furnace (8) in FIG. 3, the top end (15) may receive and hold and/or support perforated cooking surfaces (such as grill or grills 16) and/or small solid cooking or warming surfaces (not shown). Perforated cooking surfaces larger in size than the circumference of the enclosure wall top edge (3) may rest thereon or be fastened in place; smaller cooking surfaces may require attachment to the enclosure wall (2). The furnace (8) in FIG. 3 illustrates the preferred cooking/warming surface configuration: a grill (16) resting on and extending out beyond the top edge (3) of the wall (2). The preferred grill (16) extends beyond the horizontal extent of the top end (15) a distance at least ¼ the diameter of the wall (2), for providing a cooler area for holding cooked food. Optional solid cooking/warming surfaces (not shown) should extend less than half way across the interior space (9), so that they do not significantly block or redirect air and smoke flow.

Figure 4A:
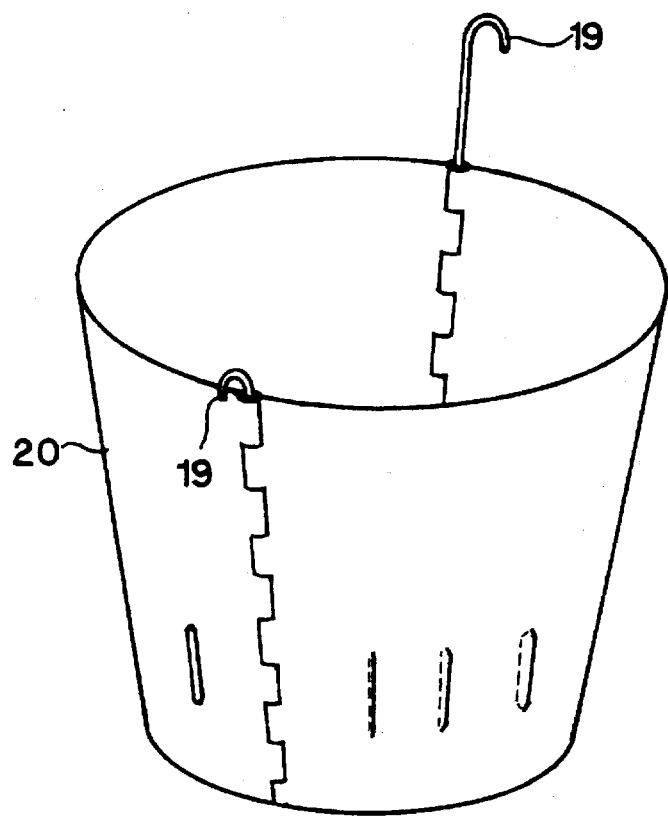
FIG. 4A shows another embodiment of the invention, configured with two separable connections.
Figure 4B:
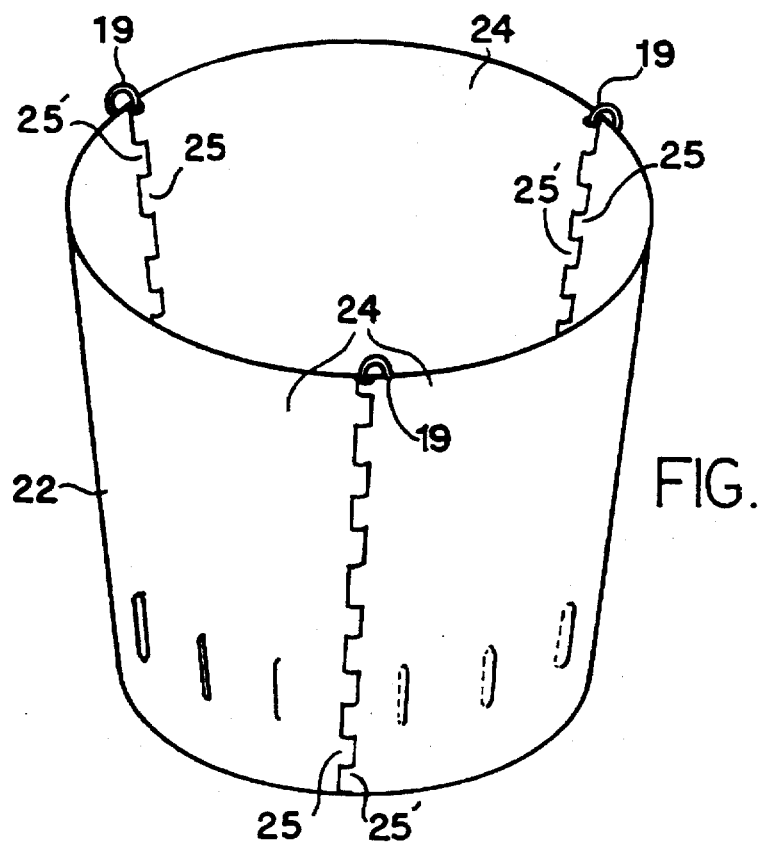
FIG. 4B shows another embodiment of the invention, configured with three separable connections.
Figure 5:
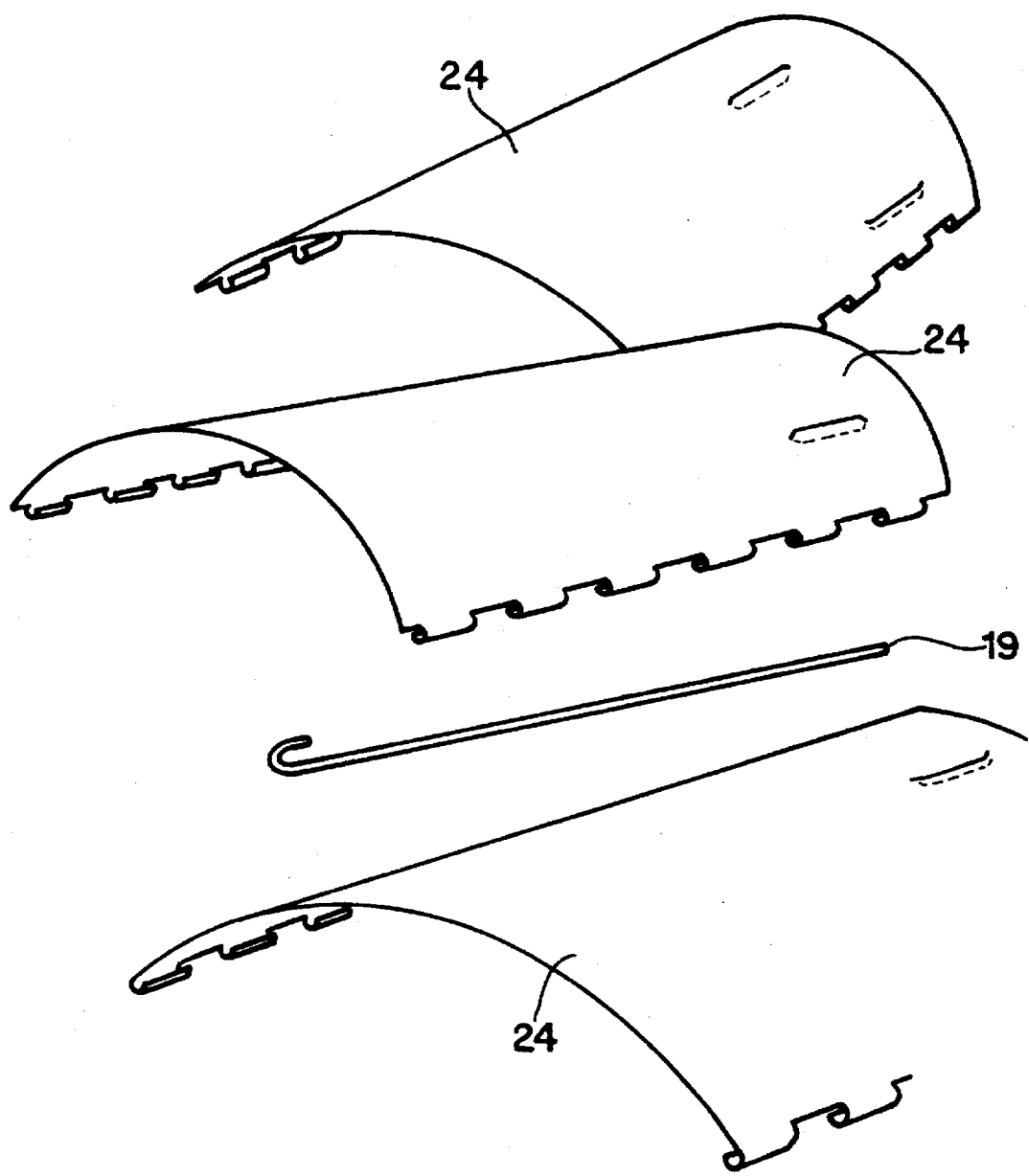
FIG. 5 shows the furnace of FIG. 4B disassembled, showing the three separated enclosure wall sections and one of the three removed pins.

The portability of this camping cooking furnace may be enhanced by varying the shape and design of the enclosure wall. An enclosure wall which is slightly cone-shaped would allow two or more furnaces to be stacked together, assuming removable cooking/warming surfaces and unobstructed interiors. Preferably, the furnace has an enclosure wall comprising two or more sections that separable for allowing disassembly and/or flattening of the enclosure wall. For example, the enclosure wall (20) shown in FIG. 4A has two removable hinge pins (19) that allow the enclosure wall (20) to be broken down into two sections. FIG. 4B shows an enclosure wall (22) having three separable sections (24) with removable hinge pins (19). The sections (24) are generally partly cylindrical, having side edges (25, 25') that extend vertically or "axially" along the entire length of the enclosure wall (22). These disconnectable sections (24) allow the wall (22) to be opened up and stored or transported in a "flatter" configuration as shown in FIG. 5. For example, the separable sections (24) may be nested on top of each other in a carrying bag or box, and, thus, may be stored in a space roughly the size of one of the sections (24).

Alternatively, furnace enclosure walls may be other shapes besides generally cylindrical. For example, an enclosure wall may be made of several hinged, flat sections, which disconnect from each other or pivot relative to each other for storage in a flatter shape.

Optionally, the invented furnace may be equipped with a utensil or glove box or container, which preferably is connected to a cool edge of the grill or to the top outside surface of the enclosure wall.

In this description and the claims, the terms "hinge" and "hinge means" include any type of pivotal connection that allows two sections to pivot to lie at varying angles to each other, even temporarily.

Although this invention has been described above with reference to particular means, materials and embodiments, it is to be understood that the invention is not limited to these disclosed particulars, but extends instead to all equivalents within the scope of the following claims.

I claim:

1. A camping furnace for use with a camp fire or ashes on the ground, the furnace consisting of:
   (a) an enclosure having a generally vertical, generally cylindrical enclosure wall, the enclosure having a diameter, an open top, and an open bottom for placement on the ground, wherein the length of the cylindrical enclosure wall from the open top to the open bottom equals or exceeds the diameter of the enclosure;
   (b) said cylindrical enclosure wall defining an interior space for receiving the camp fire or ashes and having a bottom edge nears the open bottom and vertical louvre openings near the bottom edge for permitting air flow tangentially into interior space to swirl in the same direction and having a top edge near the open top, there being no openings near the top edge and no openings at or above the midway point of the enclosure wall; and
   (c) wherein, when the enclosure wall is lifted off the ground, the camp fire or ashes fall out of the furnace through the open bottom.

2. A furnace as set forth in claim 1, further consisting of a grill extending across the open top of the furnace and supported by the enclosure wall.

3. A furnace as set forth in claim 2, wherein the said grill has a portion extending generally horizontally out, beyond the horizontal extent of the enclosure wall, a distance at least ¼ the width of the open top.

4. A furnace as set forth in claim 1,
   (a) wherein said enclosure wall has a plurality of separable sections;
   (b) the furnace further comprises a connection means for connecting the plurality of sections together during use; and,
   (c) a disconnection means for separating the sections for storage.

5. A furnace as set forth in claim 4, wherein the enclosure wall is generally cylindrical and said sections are generally partly cylindrical and have side edges running generally vertically from the open top to the open bottom.

6. A furnace as set forth in claim 5, wherein the furnace has three of said sections.

7. A furnace as set forth in claim 5, wherein the connection and disconnection means comprises a hinge having a removable hinge pin.

8. A furnace as set forth in claim 1, wherein:
   (a) said enclosure wall comprising a plurality of sections; and
   (b) the furnace further comprising hinge means connecting the sections, so that the enclosure wall sections may be moved relative to each other to flatten the enclosure wall for storage.

9. A furnace as set forth in claim 8, further consisting of a disconnection means for separating two of the enclosure wall sections for opening the enclosure wall.

10. A camping furnace for use with a camp fire, the furnace consisting of:
    (a) an enclosure having a generally vertical, generally cylindrical enclosure wall with the enclosure having a diameter, an open top, and an open bottom, said cylindrical enclosure wall defining an interior space for receiving the camp fire and said wall having a plurality of separable semi-cylindrical sections, wherein the length of the cylindrical enclosure wall from the open top to the open bottom equals or exceeds the diameter of the enclosure;
    (b) connection means for connecting the plurality of sections together during use;
    (c) disconnection means for separating at least two of the sections from each other; and
    (d) the sections having a bottom edge near the open bottom and vertical louvre openings near the bottom edge for permitting air flow tangentially into said interior space to swirl in the same direction and having a top edge near the open top, there being no openings near the top edge and no openings at or above the midway point of the enclosure wall.

11. A camping furnace as set forth in claim 10, further, consisting of a grill extending across the open top of the furnace and supported by the enclosure wall.

12. A camping furnace for use with a camp fire or ashes on the ground, the furnace consisting of:
    (a) a generally vertical, generally cylindrical enclosure wall, the enclosure having a diameter, an open top, and an open bottom for placement on the ground, wherein the length of the cylindrical enclosure wall from the open top to the open bottom equals or exceeds the diameter of the enclosure, said generally cylindrical enclosure wall defining an interior space for receiving the camp fire or ashes and having a bottom edge near the open bottom and vertical louvre openings near the bottom edge for permitting air flow tangentially into said interior space to swirl in the same direction and having a top edge near the open top, there being no openings near the top edge and no openings at or above the midway point of the enclosure wall; and
    (b) a grill extending across the open top of the furnace and supported by said enclosure wall; and
    (c) wherein, when the enclosure wall is lifted off the ground, the camp fire or ashes fall out of the furnace through the open bottom.

13. A furnace as set forth in claim 12, wherein the said enclosure wall comprises:
    (a) a plurality of separable sections;
    (b) a connection means for connecting the plurality of sections together during use; and,
    (c) a disconnection means for separating the sections for storage.

14. A furnace as set forth in claim 13, wherein the enclosure wall is generally cylindrical and said sections are generally semi-cylindrical and have side edges running generally vertically from the open top to the open bottom.

* * * * *